Figure 1:
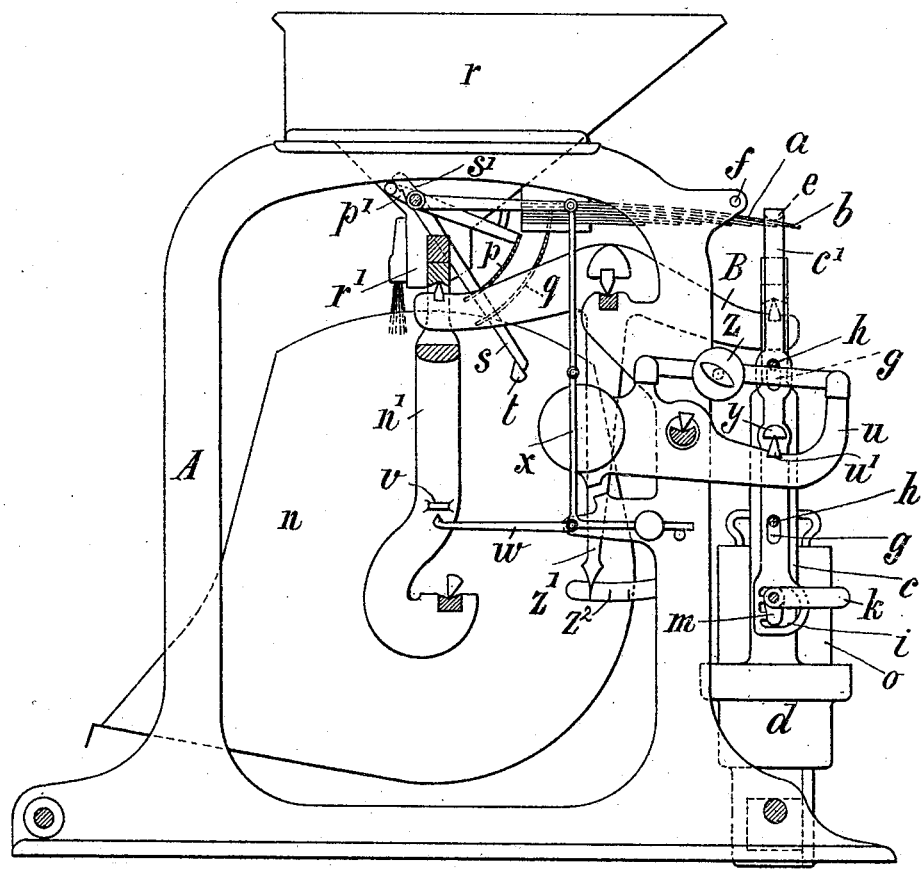

M. E. REISERT.
AUTOMATIC WEIGHING SCALE.
APPLICATION FILED SEPT. 9, 1908.

941,588.

Patented Nov. 30, 1909.

5 SHEETS—SHEET 1.

Witnesses.
Jesse N. Lutton

Inventor
Michael Eduard Reisert
by Henry Orth Jr.
atty.

M. E. REISERT.
AUTOMATIC WEIGHING SCALE.
APPLICATION FILED SEPT. 9, 1908.

941,588.

Patented Nov. 30, 1909.
5 SHEETS—SHEET 2.

Witnesses.
Jesse N. Lutton.
B. W. Sommers.

Inventor.
Michael Eduard Reisert
by Henry Orth Jr.
Atty.

M. E. REISERT.
AUTOMATIC WEIGHING SCALE.
APPLICATION FILED SEPT. 9, 1908.

941,588.

Patented Nov. 30, 1909.
5 SHEETS—SHEET 3.

Witnesses.
Jesse H. Sutton
B. Sommers

Inventor
Michael Eduard Reisert
by
Henry Orth
Atty.

M. E. REISERT.
AUTOMATIC WEIGHING SCALE.
APPLICATION FILED SEPT. 9, 1908.

941,588.

Patented Nov. 30, 1909.

5 SHEETS—SHEET 4.

Witnesses.

Inventor.
Michael Eduard Reisert
by Henry Orth Jr.
Atty.

M. E. REISERT.
AUTOMATIC WEIGHING SCALE.
APPLICATION FILED SEPT. 9, 1908.

941,588.

Patented Nov. 30, 1909.
5 SHEETS—SHEET 5.

Witnesses.
Jesse N. Sutton.
B. Sommers

Inventor
Michael Eduard Reisert
by Henry Osth Jr.
Atty.

UNITED STATES PATENT OFFICE.

MICHAEL EDUARD REISERT, OF HENNEF-ON-THE-SIEG, GERMANY, ASSIGNOR TO HENNEFER MASCHINENFABRIK C. REUTHER & REISERT, M. B. H., OF HENNEF-ON-THE-SIEG, GERMANY.

AUTOMATIC WEIGHING-SCALE.

941,588.  Specification of Letters Patent.  Patented Nov. 30, 1909.

Application filed September 9, 1908. Serial No. 452,267.

*To all whom it may concern:*

Be it known that I, MICHAEL EDUARD REISERT, a subject of the Emperor of Germany, and resident of Hennef-on-the-Sieg, in the Province of Rhineland and Kingdom of Prussia, Germany, have invented new and useful Improvements in Automatic Weighing Scales, of which the following is a specification.

The present invention relates to improvements in automatic weighing scales and more particular to scales for weighing corn, grain and other granular material in which two valves are provided to close on the movement of the scale, one provided with openings or slots to cut off the flow of the granular material to a certain extent, when the scale is nearly filled and the other to cut off the flow completely, when the scale is filled to the predetermined amount. Special means have been proposed to set the beam of the scale in motion before the charge has attained its proper weight for the purpose of closing the first named valve. According to the present invention this means consists of a flat bar-spring attached to the frame with one end and engaging the beam or the suspension bars or hangers with the other end so as to assist the load of the material on the scale until the first valve is closed. Springs are apt to decrease in force when overcoming the power, they are intended to counteract, and thus the movement of the scale acted upon by the spring will be slow. The decrease of tension is particularly even, decided and quick with flat springs. For this reason a rather powerful spring can be employed, which initiates the movement of the scale evenly and to the desired speed, so that the first part of the feed of the material may be allowed to be very strong and the complete weighing will take less time than in scales known heretofore. This effect can be still increased by making use of a laminated flat-spring, the lamels being of decreasing lengths. The application of the flat spring to initiate the movement of the scale has the advantage over other means, that means can be employed to make the first named means ineffective together with the tare beam as hereinafter described.

Figure 2:
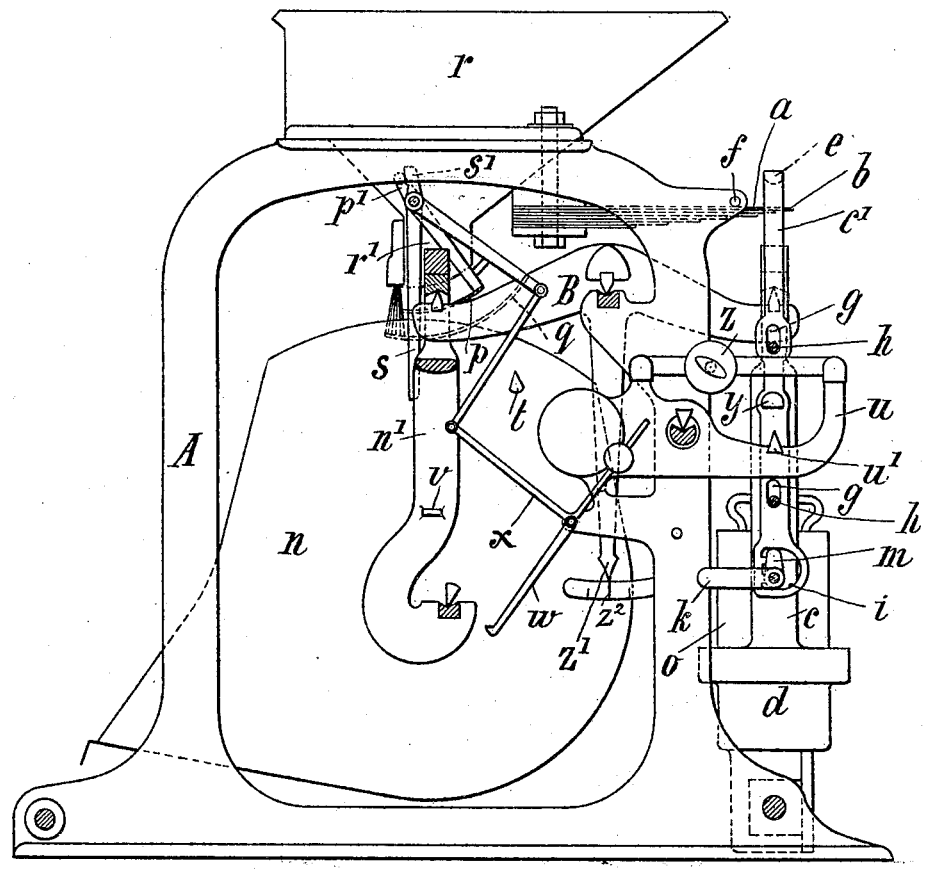
Figure 3:
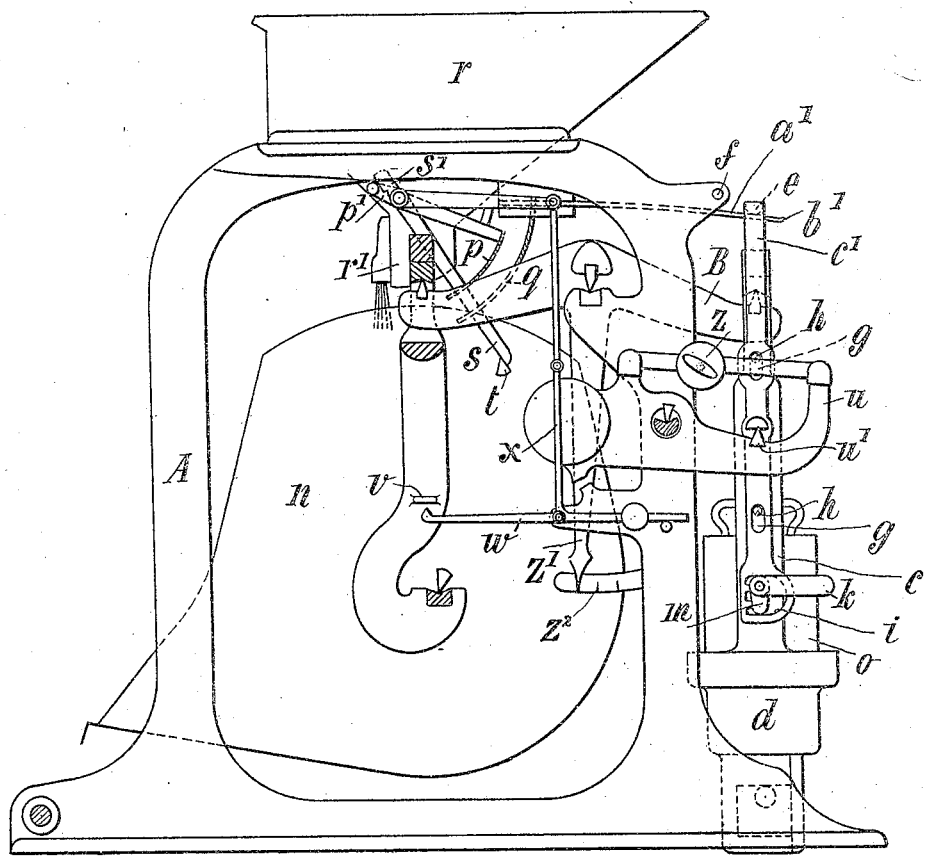
Figure 4:
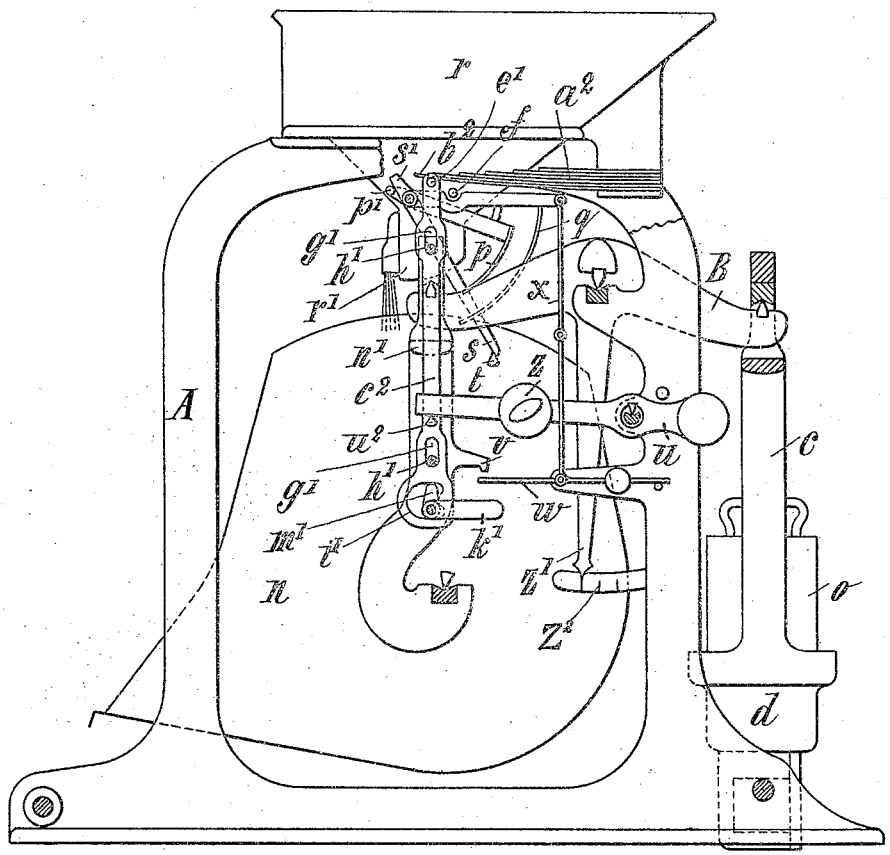
Figure 5:
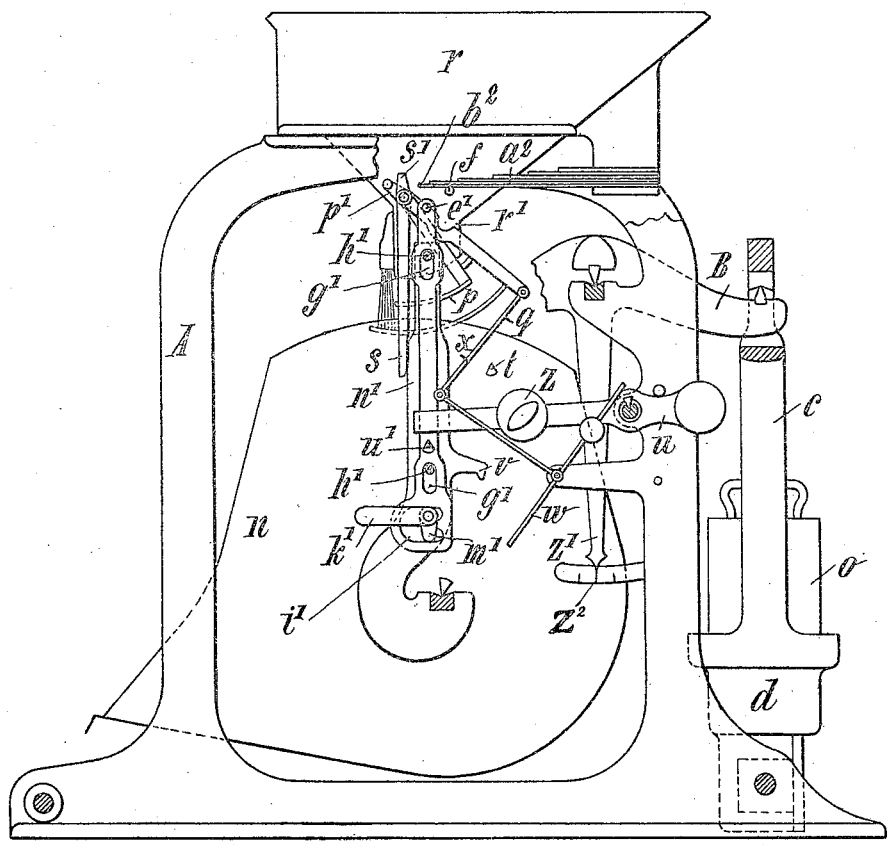

In the accompanying drawings Figure 1 is a side view of my improved automatic weighing scale showing the position of the parts before the material to be weighed begins to fall into the scale, Fig. 2 is a similar view when the scale is filled and may be tested as to the filling. Fig. 3 is a side view partly in section of a modification in which the laminated spring is replaced by a single flat spring and Figs. 4 and 5 are similar views of another modification in two different positions, the spring being so constructed as to depress the hanger of the receptacle instead of raising the hanger of the weight pan, as shown in the other figures.

In the construction shown in Figs. 1 and 2 of the drawings the spring $a$, which is attached to the frame A by means of bolts, is made of a number of lamels varying in lengths, but it may be made of a single flat bar as $a^1$ shown in Fig. 3. In these constructions the end $b$ or $b^1$ respectively of the spring catches underneath a projection $e$ which may be arranged on the suspension bar or hanger $c$ of the weight-pan $d$. The tension of the spring must be so chosen that the spring when in horizontal position has no strain or it may have still some tendency to bend upward when horizontal but in such case is preferably kept in its horizontal position by a stud or pin $f$ attached to the frame. In the construction shown the projection $e$ is arranged on a bar $c^1$ slidably attached to the hanger $c$, by means of pins or bolts $h$ projecting through longitudinal slots $g$ in the bar $c^1$. At the lower part of the bar $c^1$ there is an opening into which a cam $m$ projects pivoted to the hanger $c$ and provided with a handle $k$. In its working position, as shown in Fig. 1, the cam holds the bar $c^1$ in its lowest position.

As is usual in scales of this description the spout $r^1$ of the hopper $r$ can be closed by two valves $p$ and $q$, which are open in the position shown in Fig. 1 to allow the material to be weighed to flow down into the receptacle $n$. When a predetermined amount of material has run into this receptacle the tension of the spring $a$ will be gradually overcome and the scale-beam B will be set in motion. On the receptacle $n$ there is a stud $t$ engaging an arm $s$ rotatably arranged on the pivot of the inner valve $p$ and provided with a prolongation $s^1$ engaging an arm $p^1$ of the valve $p$. These parts are known and usual on scales of this description and their operation therefore need not be described here. When the scale has moved to a certain extent by the aid of the spring $a$, the arm $s$ is released and the valve $p$ drops down, thus partly closing the spout $r^1$ and from this moment only thin streams of material run into the scale. The pressure of the spring $a$ on the movable parts of the scale discontinues, either for the reason that the spring has lost its tension or is arrested by the pin $f$. During the flow of the thin streams of material the known tare-beam $u$ acts against the hanger of the weight-pan $d$ by means of a knife-edge $u^1$. In the construction shown the bearing $y$ for the knife-edge $u^1$ is arranged on the bar $c^1$. On the hanger $n^1$ for the receptacle $n$ there is a lug $v$ for engaging an arm $w$ of a toggle $x$ constructed and acting in the same way as is described in my former patent 652,642 to open and hold the outer valve $q$. When the receptacle $n$ is filled to the proper amount the hanger $n^1$ is moved down so far, that the lug $v$ trips the toggle $x$ and the valve $q$ completely shuts off the feed of the material.

If it is desired to examine whether the scale gives the correct weight, the tilting of the receptacle $n$ is prevented and when the filling has been completed and the valve $q$ has been closed in the manner described above, the handle $k$ is turned over to bring the cam $m$ and the bar $c^1$ from the position shown in Fig. 1 into that shown in Fig. 2. The projection $e$ is hereby raised from off the spring $a$ and at the same time the bearing $y$ from off the knife edge $u^1$ of the tare beam $u$. Thus the movable parts of the scale are allowed to balance, and should it be found that the tongue $z^1$, when at rest, is not opposite its prescribed index $z^2$ the poise $z$ on the tare beam $u$ is shifted to the right or to the left as the case may be, to a corresponding length. The tare beam $u$ thereupon will bear against the hanger $c$ with greater or less force, when the next quantity is weighed, which then will have a more correct weight than the former charge.

The operation of the apparatus shown in Figs. 1, 2 and 3 is as follows: In the position shown in Fig. 1 or 3, in which the weight pan $d$ is loaded by the weight $o$, the valves $q$ are both open. The material from the hopper $r$ runs down freely into the receptacle $n$. As soon as this receptacle is filled to such an extent that its weight together with the tension of the spring $a$ or $a^1$ respectively balances the weight $o$ and the weight pan, the tare beam is set in motion until the pin $t$ on the receptacle $n$ releases the arm $s$, whereupon the inner valve $p$ shuts off the strong stream, thus allowing merely a thin stream to run through the spout $r^1$. The receptacle $n$ thus will now move down only very slowly, during which time the tare-beam $u$ acts on the weight pan by aid of the knife edge $u^1$. When the filling is completed the lug $v$ contacts with the arm $w$ of the toggle $x$, which now moves into the position shown in Fig. 2 and shuts the outer valve $q$.

In the modification shown in Figs. 4 and 5 the spring $a^2$ instead of projecting outwardly projects inwardly and is adapted to depress the hanger of the receptacle instead of to raise that of the weight pan. In this modification also the hanger $n^1$ instead of the hanger $c$ is provided with a vertically sliding bar $c^2$ having two slots $g^1$ into which pins or bolts $h^1$ on the hanger $n^1$ project. Similar to the bar $c^1$ of the apparatus described with reference to Figs. 1 and 2 the bar $c^2$ is provided with a loop $i^1$, into which a cam $m^1$ projects, pivoted to the hanger $n^1$ and provided with a handle $k^1$. On the bar $c^2$ is a knife edge $u^2$, on which rests the tare beam $u$ having the poise $z$. The bar $c^2$ is adapted to catch under the end $b^2$ of spring $a^2$ with its projection $c^1$ and to lift it off the pin $f$, when the parts return to the position shown in Fig. 4. The operation of the apparatus is similar to that described with reference to Figs. 1, 2 and 3.

I claim:

1. An automatic weighing scale comprising two cut-off valves and a flat spring adapted to initiate the movement of the scale until one valve, which partly cuts off the material, is closed.

2. An automatic weighing scale comprising two cut-off valves, a flat spring composed of lamels varying in length adapted to initiate the movement of the scale until one valve, which partly cuts off the material, is closed.

3. An automatic weighing scale comprising two cut-off valves, a flat spring attached to the scale frame, a movable bar, and a projection on the latter adapted to be engaged by the free end of the spring.

4. An automatic weighing scale comprising two cut-off valves, a flat spring attached to the scale frame, a movable bar, a weight hanger, a movable bar connected with the hanger, and a projection on the movable bar adapted to be engaged by the free end of the spring.

5. An automatic weighing scale comprising two cut-off valves, a flat spring attached to the scale frame, a weight hanger, and a releasable projection connected with the hanger, adapted to be engaged by the free end of the spring.

6. An automatic weighing scale comprising two cut-off valves between the scale hopper and receptacle a flat spring attached to the scale frame, a weight hanger, a movable bar on the latter, and a projection on the bar adapted to be engaged by the free end of the spring.

7. An automatic weighing scale comprising two cut-off valves between the scale hopper and receptacle, a flat spring attached to the scale frame, a weight hanger, a movable bar connected with the hanger, a projection on said bar adapted to be engaged by the free end of the spring, a tare beam and a bearing on the bar for the beam.

8. An automatic weighing scale comprising two cut-off valves movable between the scale hopper and receptacle, a flat spring attached to the scale frame, a weight hanger, a movable bar slidably connected with the hanger, a projection on the bar adapted to be engaged by the free end of the spring, a tare-beam, a bearing on the bar for the latter, and a hand operated cam rotatable on the hanger adapted to move the bar.

MICHAEL EDUARD REISERT.

Witnesses:
DESIDERIUS VANDORN,
M. KÜPPERS.